United States Patent
Chang et al.

(10) Patent No.: US 6,260,193 B1
(45) Date of Patent: Jul. 10, 2001

(54) SYNCHRONIZATION OF DECODERS IN A BI-DIRECTIONAL CATV NETWORK

(75) Inventors: Kevin T. Chang, Neshanic Station, NJ (US); David E. Chodelka, Holland, PA (US); Charles E. Schell, III, Churchville, PA (US); Sam Reichgott, Bethlehem, PA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/021,006

(22) Filed: Feb. 9, 1998

(51) Int. Cl.[7] .................................................. H04N 7/173
(52) U.S. Cl. ............................................. 725/121; 725/116
(58) Field of Search ................................... 725/121, 116, 725/117, 114, 122, 123; 348/500, 510, 512, 513, 518, 478, 479, 461, 460, 464, 465, 467; H04N 7/16, 7/173

(56) References Cited

U.S. PATENT DOCUMENTS

| | | |
|---|---|---|
| 4,245,245 | 1/1981 | Matsumoto et al. . |
| 4,553,161 | 11/1985 | Citta . |
| 4,554,579 | 11/1985 | Citta . |
| 5,481,542 * | 1/1996 | Logston et al. ........................... 348/7 |
| 5,546,119 | 8/1996 | Bestler et al. . |
| 5,570,347 | 10/1996 | Bestler et al. . |
| 5,764,275 | 6/1998 | Lappington et al. . |
| 5,883,901 * | 3/1999 | Chiu et al. .............................. 348/10 |
| 5,920,800 * | 7/1999 | Schafer .................................. 348/12 |
| 6,028,860 * | 2/2000 | Laubach et al. ....................... 348/13 |
| 6,032,181 * | 3/1999 | Bedgedjian et al. ................... 348/12 |

FOREIGN PATENT DOCUMENTS

WO 85/02742    6/1985 (WO) .

* cited by examiner

*Primary Examiner*—Chris Grant
(74) *Attorney, Agent, or Firm*—Barry R. Lipsitz; Douglas M. McAllister

(57) ABSTRACT

A system for synchronizing one or more decoders with a network sync signal at a headend of a television communication network. The system allows decoders to transmit upstream messages synchronously in time slots which are defined according to the network sync signal, thereby improving system throughput. Identifying data is provided in a blanking interval (VBI or HBI) of one or more television signals to designate a horizontal scan line of the respective television signal which follows a reference point in the network sync signal by a predetermined delay. At each decoder, the identifying data is recovered, and the onset of the designated scan line can be used to signal the start of a transmission for the decoder. Preferably, the identifying data is provided in each television signal so the user is not forced to tune to a particular television channel to transmit a message. Various channel access protocols may be used, such as a session oriented protocol, or a synchronized ALOHA protocol.

32 Claims, 9 Drawing Sheets

SYNCHRONIZATION OF DECODERS IN A BI-DIRECTIONAL CATV NETWORK

BACKGROUND OF THE INVENTION

The present invention relates to a method and apparatus for synchronizing a number of decoders in a bi-directional communication network such as a cable television network. In particular, synchronizing data that is inserted into a blanking interval of each television signal designates a horizontal line which is synchronized with a network synchronization (sync) clock. By synchronizing each television signal with the network sync clock, each subscriber terminal (e.g., decoder) in the network can also be synchronized with the network sync clock, and an upstream channel can be time-shared by one or more subscriber terminals to communicate messages synchronously with the network clock to a headend or other network control center.

Interactive applications for television communication networks allow users to transmit messages upstream from a decoder/transmitter terminal (e.g., set-top box) to a headend, or central control point, of the television network. For example, in cable television networks, one or more upstream or return paths are provided for such upstream messages. The upstream path may be provided in the frequency range of 5–30 MHz, for example. Moreover, many set-top boxes which are currently deployed transmit in the range of 8–12 MHz or 8–15 MHz. Generally, the upstream signals do not interfere with the television signals, which are transmitted at carrier frequencies from about 50–500 MHz.

The provision of an upstream channel allows users to transmit messages relating to pay-per-view (PPV) requests, near-video-on-demand (NVOD) requests, requests for account status, Internet access commands, electronic mail, opinion poll data, game or contest data, home shopping data, or other interactive services, for example. Additionally, the above data may be accumulated by the decoder and transmitted on a near-real-time basis or non-real-time basis. Moreover, maintenance functions of the decoder which do not require a user input may also require transmission of upstream messages. This non-user data may relate to monitoring of viewing selections for marketing purposes. Alternatively, non-user data may relate to a decoder status, for example, whether the decoder has been tampered with, or whether the decoder has been updated with particular software.

However, to optimize the throughput of the upstream channel, it is necessary to have a scheme for coordinating the upstream messages of each decoder. With one conventional scheme, the headend polls a particular decoder using an out-of-band signal (e.g., out of the television signal band) to inform that decoder that it can begin transmitting its upstream message. Since the headend controls the transmission of all upstream messages, no further time synchronization between the headend and the decoders is required.

However, the polling scheme is problematic since it is not known when a particular set-top box will have a message to transmit. Allocation of an upstream transmission period which is not used is bandwidth-inefficient. Additionally, the transmission of the polling signal consumes bandwidth.

With another conventional scheme, a decoder can tune to a particular channel and synchronize to the television signal on that channel. However, the user is forced to tune to the particular channel. This can be inconvenient if the upstream message which is to be transmitted is not related to the content of the particular television signal. For example, the user may be forced to tune to a channel for ordering pay-per-view programming, but the user may wish to transmit Internet commands or other messages which are not related to the pay-per-view programming.

Additionally, with the conventional schemes, the headend must also synchronize to the particular television signal, and therefore cannot synchronize to an independent network sync signal. Moreover, the conventional schemes do not account for variations in timing of the television signal due to standard tolerances which are acceptable in the industry, and do not allow the use of an independent network sync signal which can be designed to higher accuracy tolerances.

With other conventional schemes, such as the unslotted or unsynchronized ALOHA approach, no synchronization signal is used, and each decoder begins transmitting data packets at arbitrary times. The data packets are broadcast back to the decoders when received by the headend. Thus, a decoder can verify that its packet has been received at the headend. If the packet has not been received, the decoder simply tries to re-transmit it to the headend. However, due to the probability of collisions between different packets, the system throughput is relatively low.

Accordingly, it would be desirable to provide a system for synchronizing one or more decoders in a television network with a network sync signal at a headend of the network. The system should provide synchronization of each decoder without requiring the decoders to tune to a particular television channel. The system should be effective with a plurality of asynchronous television signals. The system should avoid the need for out-of-band polling signals to be sent to the decoders. Furthermore, the system should provide real-time compensation for variations in the timing accuracy of each television signal.

The present invention provides a system having the above and other advantages.

SUMMARY OF THE INVENTION

The present invention relates to a method and apparatus for synchronizing a number of decoders with a network sync signal in a bi-directional communication network such as a cable television network.

In one embodiment, a method is presented for synchronizing a decoder in a communication network to allow upstream transmission of a message from the decoder to a headend of the communication network in a time slot, wherein the decoder is adapted to receive a television signal via the communication network. The method includes the steps of: providing a network sync signal having a network sync reference point at the headend, and providing a delay value at the headend. The delay value may be pre-programmed (e.g., stored in memory), and is selected such that the start time of the time slot follows the network sync reference point by the delay value.

A first horizontal scan line of the television signal at the headend that corresponds to the network sync reference point is determined. A particular horizontal scan line of the television signal that corresponds to the start time is also determined at the headend using the delay value and the first horizontal scan line. Identifying data which identifies the particular horizontal scan line is encoded and inserted into a blanking interval of the television signal.

The method may include the further step of inserting the identifying data into a blanking interval of the television signal which is between the first horizontal scan line and the particular horizontal scan line.

The blanking interval of the television signal may be a vertical blanking interval (VBI) or a horizontal blanking interval (HBI). The delay value is greater than a field or frame period of the television signal when the blanking interval of the television signal is a vertical blanking interval. This ensures that a VBI will be available for inserting the identifying data prior to the designated scan line.

The method may include the further steps of transmitting the television signal to the decoder via the communication network; recovering the television signal from the communication network at the decoder; extracting the identifying data of the recovered television signal; and providing a start signal using the extracted identifying data to indicate the start time for the decoder to start transmitting the message upstream to the headend in the time slot.

The method may include the further steps of monitoring horizontal scan lines of the television signal; and providing the start signal when the particular horizontal scan line of the television signal is detected.

The recovering of the television signal at the decoder may be responsive to a user command to view the television signal, e.g., to change the channel.

The method may be adapted for use in synchronizing a plurality of decoders of the communication network with the network sync signal to allow upstream transmission of a message from each of the decoders to the headend in respective time slots, wherein each of the decoders is adapted to receive a plurality of asynchronous television signals via the communication network.

In this case, the method may include the further steps of determining a respective first horizontal scan line of each of the television signals at the headend that corresponds to a respective reference point of the network sync signal; using the delay value and the respective first horizontal scan lines to determine respective particular horizontal scan lines of the television signals that correspond to respective start times of the respective time slots; encoding identifying data which identifies the particular horizontal scan lines, and inserting the identifying data into respective blanking intervals of the television signals.

The particular horizontal scan line may be different for at least two of the television signals. Moreover, the respective start times may be the same or different for the different television signals. Additionally, the invention is suitable for use with a plurality of synchronous or asynchronous television signals.

The method may include the further steps of transmitting the television signals to the decoders via the communication network; recovering the television signals from the communication network at the decoders; wherein at least two of the decoders may recover different ones of the television signals; extracting the respective identifying data of the respective recovered television signals; and for each of the decoders, providing a start signal using the extracted identifying data to indicate a start time to start transmitting the respective message upstream to the headend in the respective time slot.

In a further embodiment, an apparatus is presented for synchronizing a decoder in a communication network to allow upstream transmission of a message from the decoder to a headend of the communication network in a time slot, wherein the decoder is adapted to receive a television signal via the communication network. The apparatus comprises: means for providing a network sync signal having a network sync reference point at the headend; means for providing a delay value at the headend; wherein a start time of the time slot follows the network sync reference point by the delay value; a line counter for determining a first horizontal scan line of the television signal at the headend that corresponds to the network sync reference point; a delay calculator for using the delay value and the first horizontal scan line to determine a particular horizontal scan line of the television signal at the headend that corresponds to the start time; an encoder for encoding identifying data which identifies the particular horizontal scan line; and means for inserting the identifying data into a blanking interval of the television signal.

The means for inserting may insert the identifying data into a blanking interval of the television signal which is between the first horizontal scan line and the particular horizontal scan line.

The apparatus may further include a transmitter for transmitting the television signal to the decoder via the communication network; means associated with the decoder for recovering the television signal from the communication network at the decoder; means associated with the decoder for extracting the identifying data of the recovered television signal; and means associated with the decoder for providing a start signal using the extracted identifying data to indicate the start time for the decoder to start transmitting the message upstream to the headend in the time slot.

The apparatus may further include a line counter associated with the decoder for monitoring horizontal scan lines of the television signal; wherein the means associated with the decoder for providing the start signal provides the start signal when the particular horizontal scan line of the television signal is detected.

Furthermore, the apparatus may be adapted for use in synchronizing a plurality of decoders of the communication network with the network sync signal to allow upstream transmission of a message from each of the decoders to the headend in respective time slots; wherein each of the decoders is adapted to receive a plurality of asynchronous television signals via the communication network; the line counter at the headend determines a respective first horizontal scan line of each of the television signals at the headend that corresponds to a respective reference point of the network sync signal; delay calculations means use the delay value and the respective first horizontal scan lines to determine respective particular horizontal scan lines of the television signals at the headend that correspond to respective start times of the respective time slots; the encoder encodes identifying data which identifies the particular horizontal scan lines; and the means for inserting inserts the identifying data into respective blanking intervals of the television signals;

The transmitter transmits the television signals to the decoders via the communication network, and each of the decoders further includes: means for recovering the television signals from the communication network; wherein at least two of the decoders recover different ones of the television signals; means for extracting the respective identifying data of the respective recovered television signals; and means for providing a start signal using the extracted identifying data to indicate a start time to start transmitting the respective message upstream to the headend in the respective time slot.

In a further embodiment, a method is presented for synchronizing a decoder in a communication network with a network sync signal at a headend of the network to allow upstream transmission of a message from the decoder to the headend in a time slot. The method includes the steps of: recovering a television signal from the communication network; the television signal comprising identifying data in the blanking interval which identifies a particular horizontal scan line of the television signal which corresponds to a start time of the time slot; extracting the identifying data of the recovered television signal; and providing a start signal using the extracted identifying data to indicate the start time for the decoder to start transmitting the message upstream to the headend.

The start time follows a network sync reference point of the network sync signal by a delay value.

The blanking interval of the television signal is one of a vertical blanking interval and a horizontal blanking interval.

The method includes the further steps of: monitoring horizontal scan lines of the television signal; and providing the start signal when the particular horizontal scan line of the television signal is detected.

The recovered television signal is recovered from among a plurality of available asynchronous television signals which are transmitted to the decoder via the communication network; and each of the plurality of available television signals comprises identifying data in a blanking interval thereof which identifies a particular horizontal scan line thereof which corresponds to the start time of the time slot.

In a further embodiment a decoder is presented which is adapted to be synchronized with a network sync signal at a headend of a communication network to allow upstream transmission of a message from the decoder to the headend in a time slot. The decoder includes: means for recovering a television signal from the communication network; the television signal comprising identifying data in the blanking interval which identifies a particular horizontal scan line of the television signal which corresponds to a start time of the time slot; means for extracting the identifying data of the recovered television signal; and means for providing a start signal using the extracted identifying data to indicate the start time for the decoder to start transmitting the message upstream to the headend.

The start time follows a network sync reference point of the network sync signal by a delay value.

The decoder further includes means for monitoring horizontal scan lines of the television signal; wherein: the providing means provides the start signal when the particular horizontal scan line of the television signal is detected. The recovered television signal may be recovered from among a plurality of available asynchronous television signals which are transmitted to the decoder via the communication network; and each of the plurality of available television signals may comprise identifying data in a blanking interval thereof which identifies a particular horizontal scan line thereof which corresponds to the start time of the time slot.

DETAILED DESCRIPTION OF THE INVENTION

The present invention relates to a method and apparatus for synchronizing one or more decoders with a network sync signal in a bi-directional communication network such as a cable television network.

Figure 1:
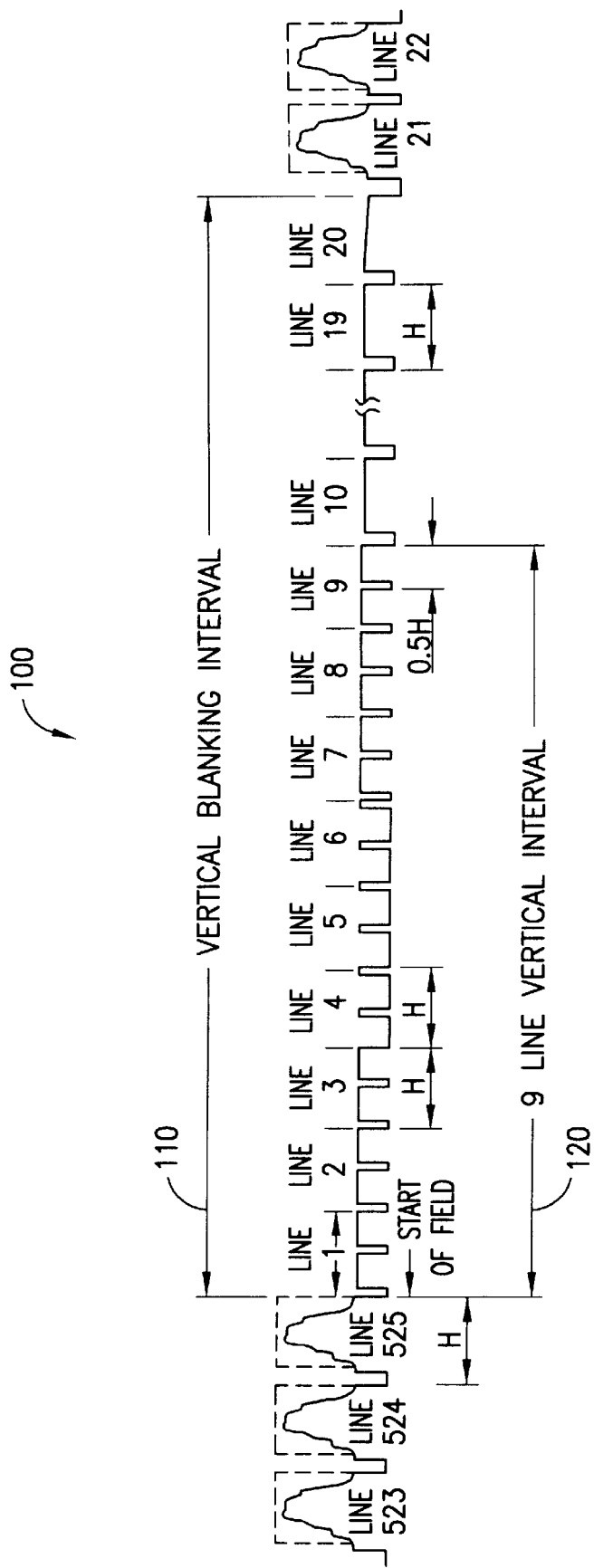
FIG. 1 illustrates a conventional television signal waveform, including the blanking interval.

FIG. 1 illustrates a conventional television signal waveform, including the vertical blanking interval. Although the television signal shown illustrates the NTSC RS-170A standard, it will be appreciated that the invention is suitable for use with other television standards, including PAL and SECAM.

The baseband television signal, shown generally at 100, includes a vertical blanking interval (VBI) 110, which comprises approximately twenty horizontal scan lines ("H"). However, these scan lines are not visible on a television since they occur during the vertical retrace of the television's raster scanned cathode ray tube. The onset of line 1 of the VBI signals the start of a new video field or frame. The relative height of the signal 100 indicates its relative amplitude.

Lines 1–9 of the VBI form a nine (9) line vertical interval 120 which has a specific modulated square wave pattern that signals the onset of the VBI. Each of lines 10–20 of the VBI has a horizontal sync pulse followed by a constant black level video portion.

Auxiliary data, also known as user data, can be modulated onto the VBI, for example, onto lines 10–20 of the VBI. The use of the VBI for communicating auxiliary data is known in the art. For example, Nuber et al. U.S. Pat. No. 5,699,124, entitled "Bandwidth Efficient Communication of User Data in Digital Television Data Stream," discloses techniques for communicating VBI user information such as closed captioning, Vertical Interval Test Signal (VITS), auxiliary real time video, and Automated Measurement of Line-up (AMOL) data, in a VBI of a digital television signal.

Horizontal scan lines 21 and 22, which follow line 20 of the VBI, are the first active video lines of the current field or frame. Each of these lines includes a horizontal sync pulse followed by an active video portion. Additionally, color burst information is provided on each active video line. For 525-line NTSC television, lines 523–525 shown at the left-most portion of the television signal 100 are the last lines of the current field or frame. Furthermore, another VBI occurs at lines 263–283. Thus, the television raster scan begins with a first VBI at lines 1–20, followed by scan lines 21–262. Then, a second raster scan begins at lines 263–283, followed by scan lines 284–525. The examples provided below will adhere to this line numbering scheme. However, the line numbering scheme may be modified, if desired, to refer only to lines 1–262 or 1–263, where the line number is reset to one at the start of each raster trace.

Moreover, a suitable line numbering scheme may be developed for progressive (frame) mode video such as that used by computers.

According to NTSC standards, the duration of the vertical blanking interval is 1,271 $\mu$sec, with a tolerance of +63.5 $\mu$sec and −0 $\mu$sec. The color burst frequency is 3.579545 MHz +/−10 Hz. The horizontal scanning frequency is 2/455 times the color burst frequency, or (2/455) 3.579545 MHz=

15,734 KHz, which corresponds to a horizontal scan period (H) of 63.55 μsec. The vertical scanning frequency is 2/525 times the horizontal scanning frequency, or (2/525) 15,734 KHz=59.942 Hz for frame mode (progressive) video. For field mode (2:1 interlaced) video, the vertical scanning frequency is 59.942/2=29.92 Hz.

Figure 2A:
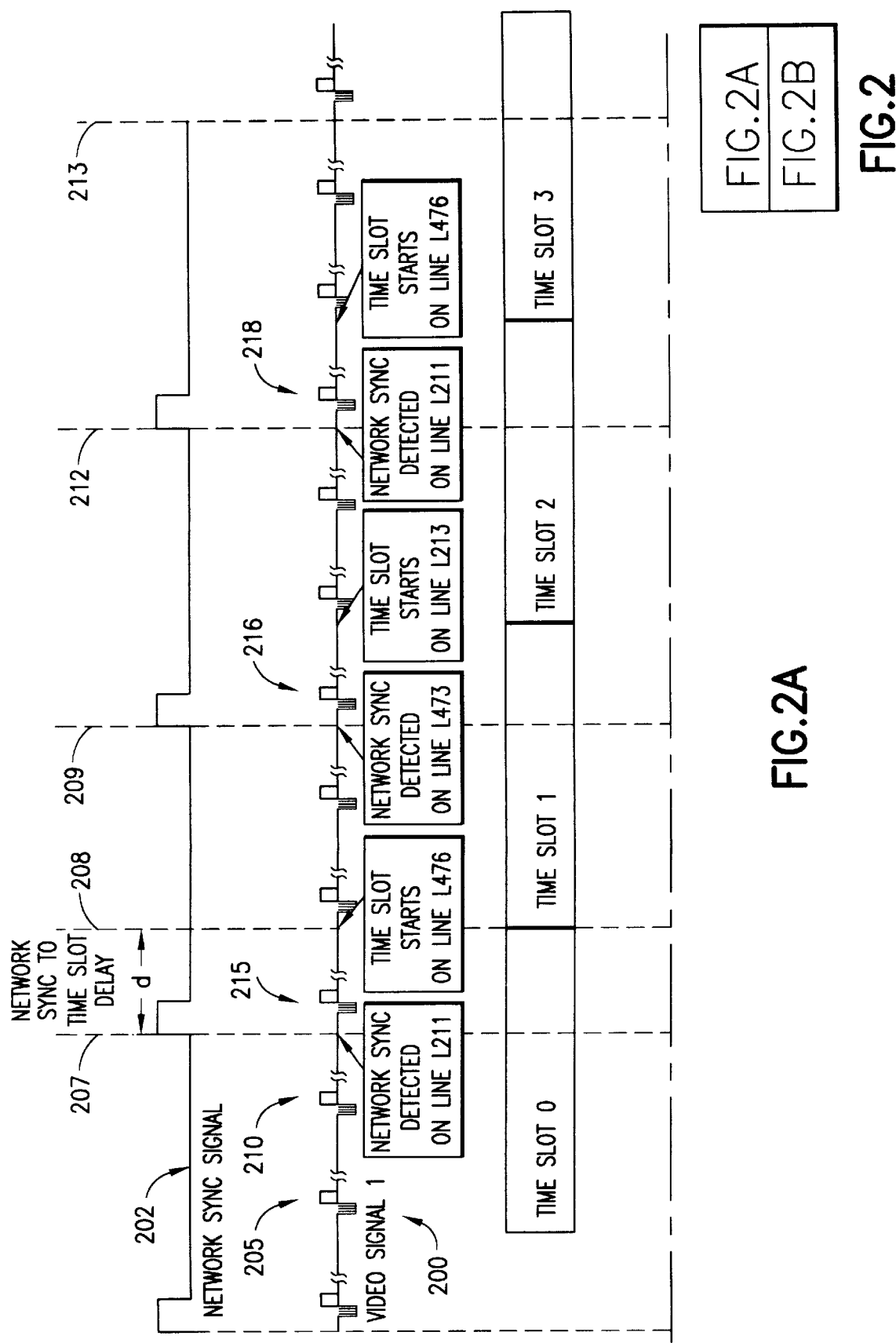
FIG. 2 illustrates a timing diagram for three asynchronous television signals in accordance with the present invention.
Figure 2B:
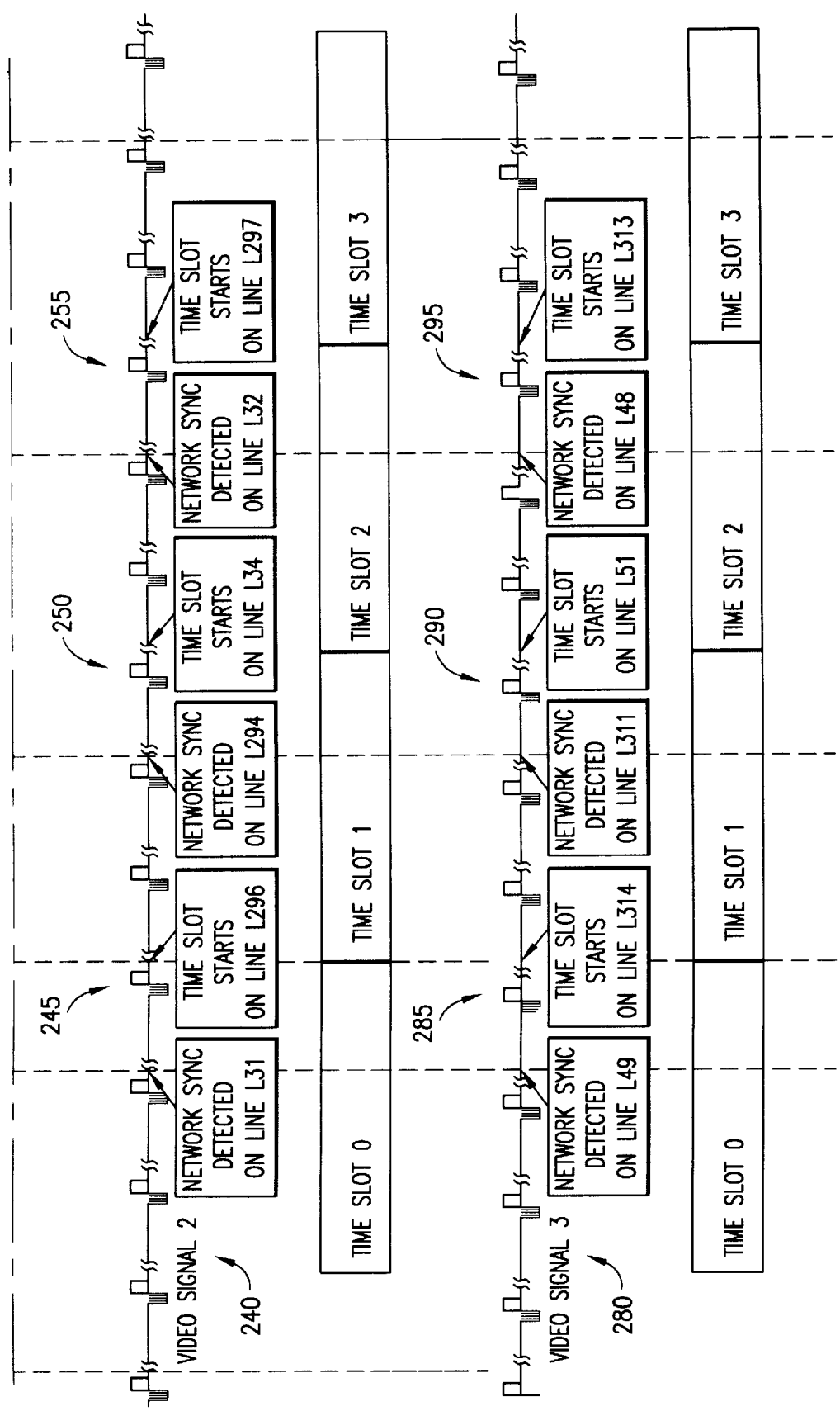

FIG. 2 illustrates a timing diagram for three asynchronous television signals in accordance with the present invention. Video signal 1 (200) includes a plurality of VBIs, including VBIs 205, 210, 215, 216 and 218, for example. It is assumed in this example that timing of video signal 1 (200) is correct. For example, with the NTSC standard, the VBI frequency, which is the same as the field or frame update rate, is specified as 29.92 Hz. The region between VBIs represents the horizontal scan lines. Each VBI signals the start of a new raster scan sequence, from the top to the bottom of a television screen.

Vertical dashed line 207, 209, 212 and 213 represent reference points of a network sync signal 202. For example, the onset of a pulse may be taken as the reference point.

Video signal 2 (240) includes a plurality of VBIs, including VBIs 245, 250 and 255. It is assumed in this example that timing of video signal 2 is slightly fast relative to the NTSC standard (e.g. faster than 29.97 Hz), so that the frequency of VBIs is faster than specified. However, this frequency is also assumed to be fixed.

Video signal 3 (280) includes a plurality of VBIs, including VBIs 285, 290 and 295. It is assumed in this example that timing of video signal 3 is slightly slow (e.g. slower than 29.97 Hz), so that the frequency of VBIs is slower than specified. The frequency is also assumed to be fixed.

Time slots for transmitting data on an upstream channel are defined by the network sync reference points 207, 209, 212 and 213 and a delay value. Specifically, the start of a time slot follows a network sync reference point by the delay value. For example, time slot 1 starts at a time indicated by dashed line 208, which follows the most recent network sync reference point 207 by the delay value (d). Similarly, time slot 2 follows the network sync reference point 209 by the delay, and time slot 3 follows the network sync reference point 212 by the delay.

In accordance with the present invention, data is provided in at least some of the blanking intervals of each video signal to indicate a line number which corresponds with the start time of a particular time slot. While the vertical blanking interval is used for this purpose in the example shown, the horizontal blanking interval may alternatively be used. For example, for video signal 1 (200), data is provided in VBI 215 to identify the following horizontal scan line L476 (e.g., in the same video frame as VBI 215) as being temporally coincident with the start of time slot 1. The horizontal scan line L476 thus follows the network sync reference point 207 by the delay (d). The delay (d)≧0.

In order to provide the identifying data in the VBI 215, the horizontal line number which is coincident with the network sync reference point is determined. In the example shown, line L211 which precedes the VBI 215 is coincident with the network sync reference point at time 207. Accordingly, the delay (d) corresponds to the time period between line L211 and line L476. This period can be easily calculated with knowledge of the horizontal scan rate and number of lines. For example, assuming a horizontal scan rate of 63.55 μsec., and 525 lines per frame or field, the delay (d) between line L221 prior to VBI 215, and line L476 following VBI 215, is (525−211+476)×63.55 μsec.=790×63.55 μsec.=50.2 msec. As discussed, with the line numbering scheme used herein, L211 is in a first field, while L476 is in a second field.

If the network sync signal was periodic with a period T which is the same as the frame or field rate of the video signal 1 (200), and assuming there was no timing error in the video signal, the horizontal scan line L476 of each subsequent video frame would be offset from each successive reference point of the network sync signal 202 by the delay (d). However, generally, there is no need for the network sync signal period to be an integer multiple of the field or frame rate of the video signals.

After the network sync reference point at time 207, the next network sync reference point is at time 209. Time 209 is coincident with line L473 which precedes VBI 216. Moreover, line L213 which follows VBI 216 also follows line L473 by the delay (d). Accordingly, data which identifies line L213 can be inserted into VBI 216, or any blanking interval between line L473 and line L213.

Similarly, after the network sync reference point at time 209, the next network sync reference point is at time 212. Time 212 is coincident with line L211 which precedes VBI 218. Moreover, line L476 which follows VBI 218 follows line L211 by the delay (d). Accordingly, data which identifies line L476 can be inserted into VBI 218, or any blanking interval between line L211 and line L476.

A predetermined portion of a horizontal scan line, such as the onset or completion of the horizontal sync pulse, may be referenced in identifying a particular line.

For video signal 2 (240), line L31 is coincident with time 207, and line L296 following VBI 245 designates the start of time slot 1. Similarly, line L294 is coincident with time 209, and line L34 following VBI 250 designates the start of time slot 2. Lastly, line L32 is coincident with time 212, and line L297 following VBI 255 designates the start of time slot 3.

For video signal 3 (280), line L49 is coincident with time 207, and line L314 following VBI 285 designates the start of time slot 1. Similarly, line L311 is coincident with time 209, and line L51 following VBI 290 designates the start of time slot 2. Lastly, line L48 is coincident with time 212, and line L313 following VBI 295 designates the start of time slot 3.

Note that video signal 1 (200) is assumed to have a standard frame or field rate, while video signal 2 (240) has a field or frame rate slower than standard, and video signal 3 (280) has a field or frame rate faster than standard.

Moreover, a designated horizontal scan line may not follow the previous network sync reference point precisely by the delay (d) due to resolution of a scan line. For example, the time following the delay (d), e.g., time 208 may fall midway between the horizontal sync pulses of two successive scan lines. Then, assuming each scan line is referenced by its horizontal sync pulse, one line or the other must be chosen, thereby resulting in an error of up to one-half the horizontal scan period (e.g., 63.55/2 μsec). However, this should pose no difficulty as each time slot may be provided with corresponding guard bands at the start and end of the time slot in which no data is carried.

The specific VBIs which are selected to carry identifying data will depend on the desired time slot width. Generally, the VBI which immediately follows the network sync reference point is used, although this is not required. Moreover, when the time slot width is greater than the period between VBIs, there may be some VBIs which do not need to carry identifying data. This is the case in the example of FIG. 2, where the time slot width is approximately equal to three VBI periods for each video signal. Therefore, only one VBI in each time slot is required to have data identifying the particular video line which corresponds to the start of the next time slot.

While the example of FIG. 2 provides time slots with equal widths, the present invention may also be used for time slots with different widths. Again, the VBI which immediately follows the network sync reference point may be used to designate the start of the time slot, e.g., after the delay (d). Further variations may be used. For example, the second VBI which follows the network sync reference point may be used to carry the identifying data which designates the relevant horizontal scan line. Moreover, the identifying data may be carried piecemeal in two or more VBIs and/or HBIs.

Additionally, note that in FIG. 2, the video signals are asynchronous relative to one another. That is, a common reference point such as the VBI is not temporally coincident in each of the video signals. This will generally be the case in television transmission networks. However, the invention is also suitable for use with synchronous television signals.

Advantageously, the present invention provides synchronizing information which allows each of the video signals to synchronize with the network sync signal 202, regardless of the asynchronicity of the video signal relative to the network sync signal 202. Moreover, variations in the timing of a particular video signal due to jitter or other tolerances are accounted for.

Figure 3:
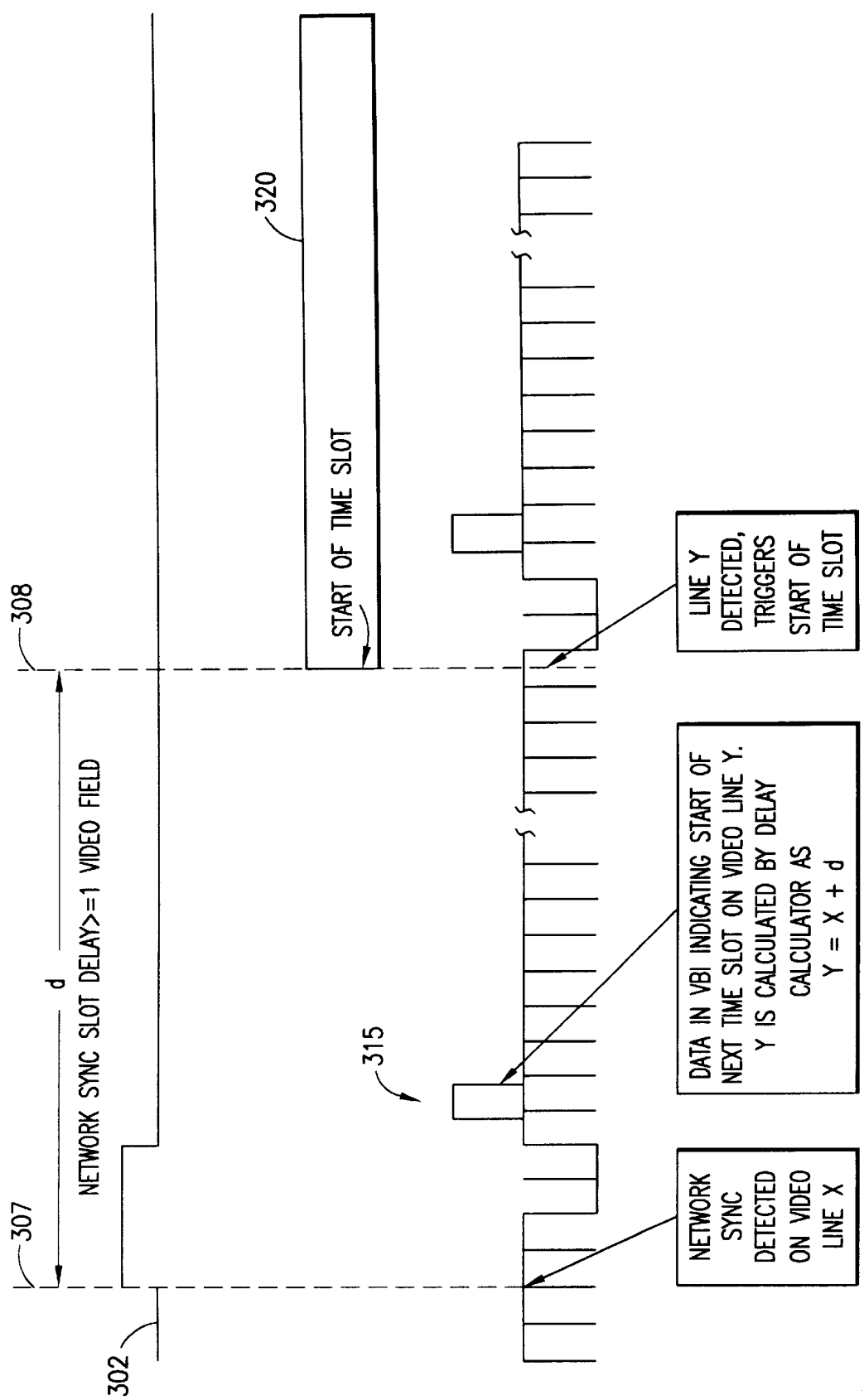
FIG. 3 illustrates a network sync to time slot delay in accordance with the present invention.

FIG. 3 illustrates a network sync to time slot delay in accordance with the present invention. The network sync reference point 307 of the network sync signal 302 and delay (d) are shown, along with the time reference 308 which indicates the start of a time slot, such as time slot 320. At the network sync reference point 307, the network sync is detected for a particular video line X. In the following VBI 315, or other blanking interval, identifying data which indicates the start of the next time slot on video line Y is inserted. Y is calculated by a delay calculator as Y=X+d. The addition is taken as modulo N, where N is the number of lines in a field or frame, e.g., N=525. At time reference 308, line Y is detected at a decoder, thereby triggering the start of the time slot 320.

Figure 4:
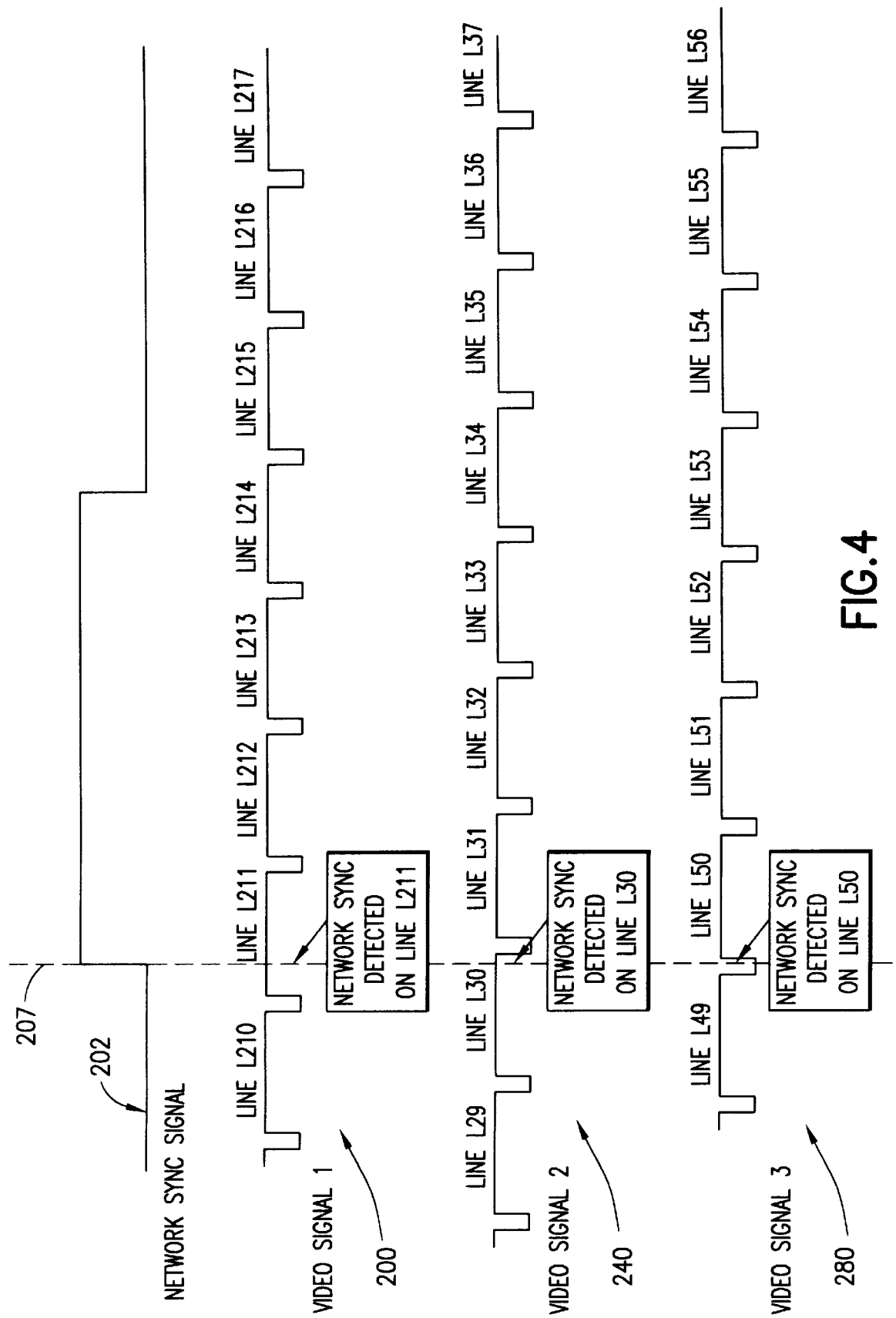
FIG. 4 illustrates network sync detection for each video signal in accordance with the present invention.

FIG. 4 illustrates network sync detection for each video signal in accordance with the present invention. FIG. 4 shows a portion of FIG. 2 in an expanded view, with individual line numbers visible. The network sync reference point 207, network sync signal 202, video signal 1 (200), video signal 2 (240) and video signal 3 (280) are shown. Note that the network sync reference point 207 may be coincident with any portion of a line.

Figure 5:
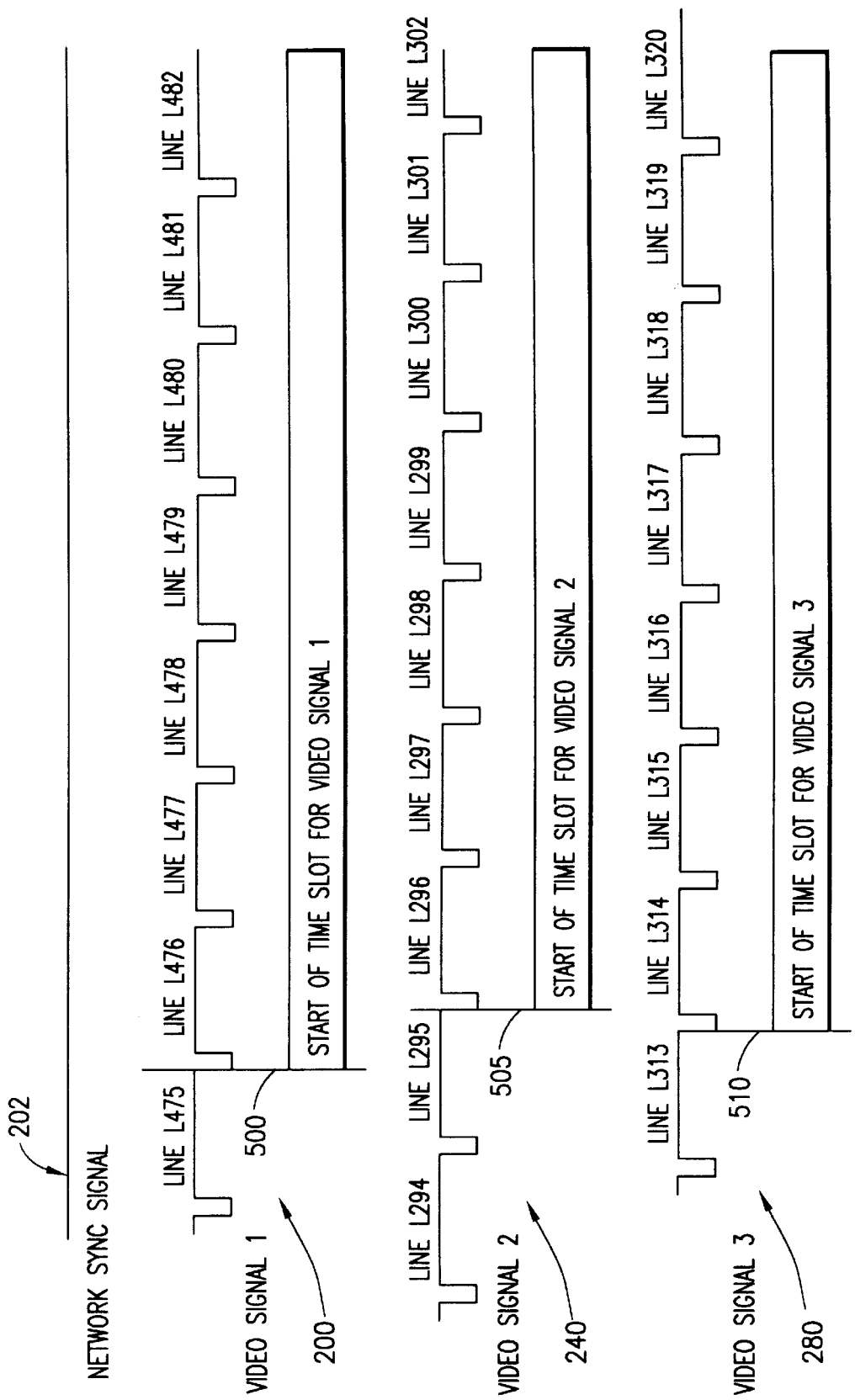
FIG. 5 illustrates time slots for each video signal, triggered by line number, in accordance with the present invention.

FIG. 5 illustrates time slots for each video signal, triggered by line number, in accordance with the present invention. FIG. 5 shows a portion of FIG. 2 in an expanded view, with each line number visible. The network sync reference point 207, network sync signal 202, video signal 1 (200), video signal 2 (240) and video signal 3 (280) are shown. Note that the start of each time slot which is defined by the different video signals may be offset from one another due to the asynchronicity of the video signals.

For example, the start 500 of a time slot defined by video signal 1 (200) is offset relative to the start 505 of a time slot defined by video signal 2 (240), and relative to the start 510 of a time slot defined by video signal 3 (280). However, the use of a guard band at the start of end of each time slot, where no data is communicated, prevents collisions between data from a first time slot which is defined by a first video signal, and data from an immediately following second time slot which is defined by a second video signal, even with a slight overlap between the two time slots.

Figure 6:
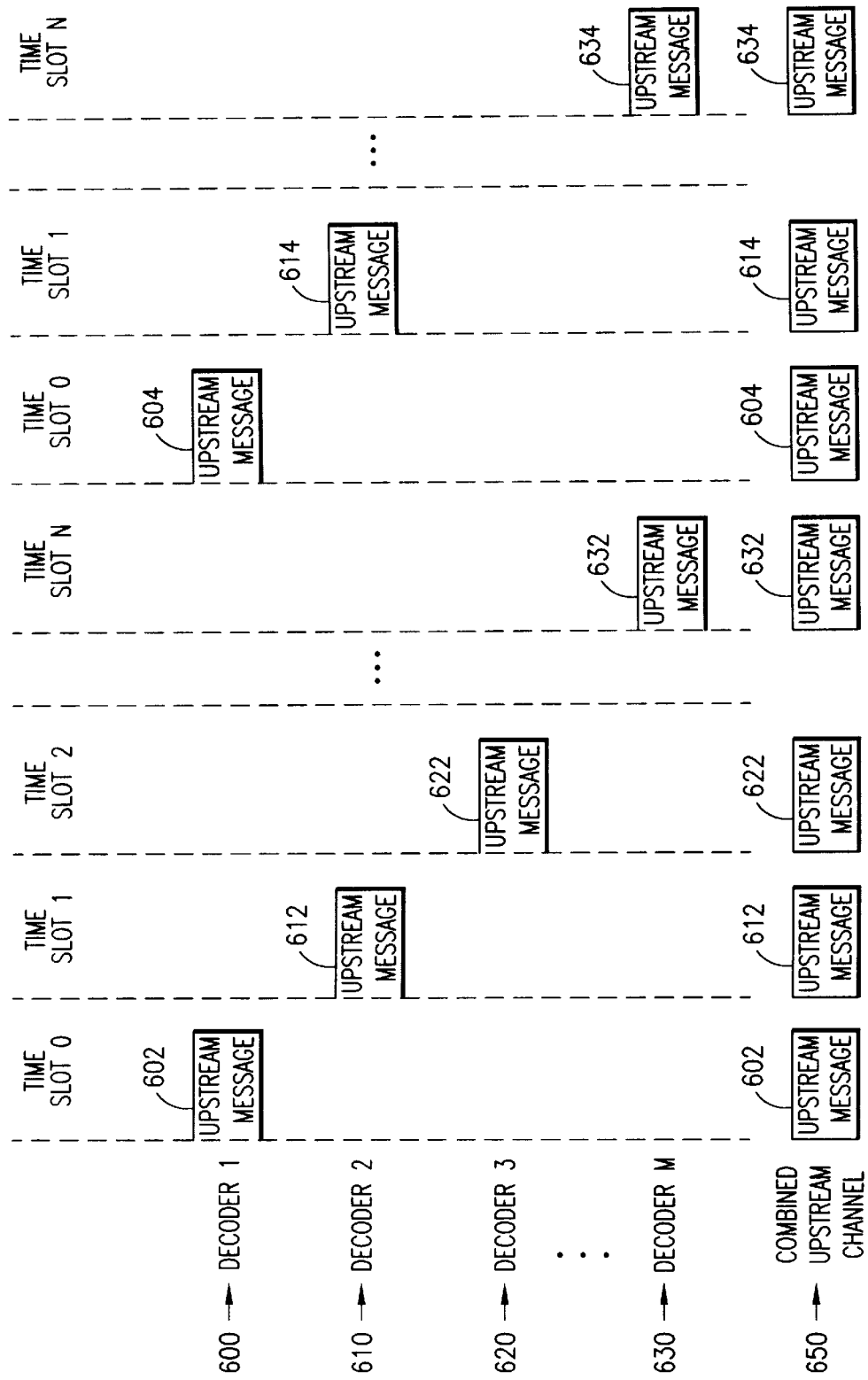
FIG. 6 illustrates a timing diagram for upstream messages which are transmitted from a plurality of decoders in accordance with the present invention.

FIG. 6 illustrates a timing diagram for upstream messages which are transmitted from a plurality of decoders in accordance with the present invention. Once each of the decoders is synchronized with the network sync signal, including the delay (d), the decoders may transmit synchronous upstream messages to a headend via a combined upstream channel.

Assume there are M decoders in a television network, including decoder 1 (600), decoder 2 (610), decoder 3 (620), . . . , and decoder M (630). The network may be a cable television network or a satellite broadcast network, for instance. For a cable television network, the upstream channel may be provided on the same cable over which the television signals are transmitted. For a satellite broadcast network, an independent return channel may be provided, e.g., via a telephone or other communication network.

For the combined upstream channel 650, which combines messages from the different decoders, repeating cycles of N time slots may be provided. For example, each cycle may have time slots 0, 1, 2, . . . , N. Since each decoder is synchronized with the network sync signal, it is possible for the decoders to transmit their respective upstream messages synchronously.

Time slots may be assigned to particular decoders based on a channel access protocol. For example, in the slotted ALOHA protocol, message packets are transmitted in time slots with defined beginning and ending times. Alternatively, in a session oriented protocol, time slots are permanently allocated to particular sessions (e.g., particular decoders), and no other session may use the allocated time slot. Virtually any available channel access protocol may be used. Furthermore, the message packets may comprise analog and/or video data.

In the illustration of FIG. 6, each decoder provides an upstream message packet. For example decoder 1 (600) provides an upstream message 602, decoder 2 (610) provides an upstream message 612, decoder 3 (620) provides an upstream message 622, and decoder M (630) provides an upstream message 632. In a subsequent time slot cycle, decoder 1 (600) provides an upstream message 604, decoder 2 (610) provides an upstream message 614, and decoder M (630) provides an upstream message 634.

Figure 7:
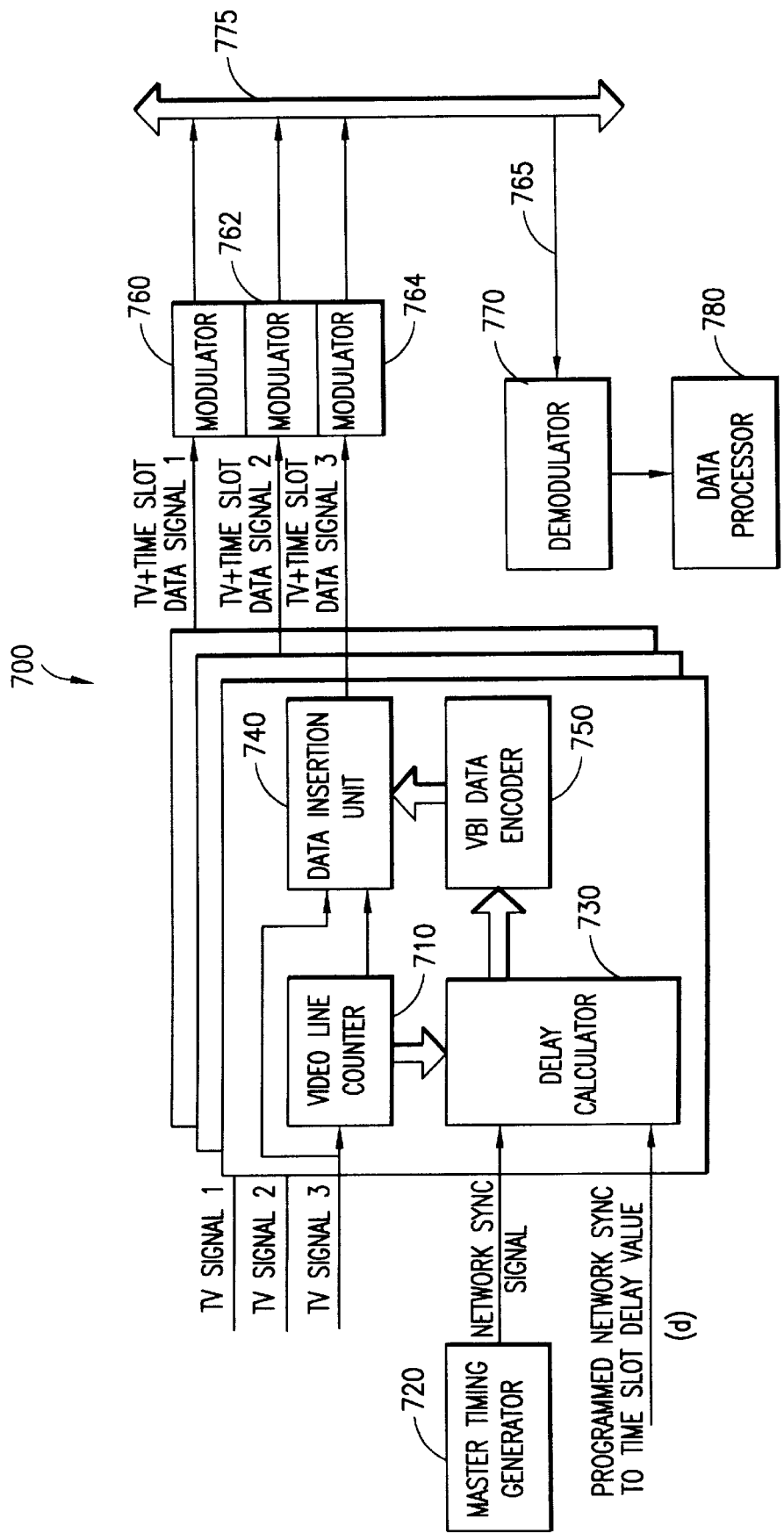
FIG. 7 illustrates a cable television headend in accordance with the present invention.

FIG. 7 illustrates a cable television headend in accordance with the present invention. The headend, shown generally at 700, receives a number of television (TV) signals, e.g., TV Signal 1, TV Signal 2 and TV Signal 3. These television signals are provided to a video line counter 710 which tracks the current line of the respective television signal. For example, for a 525-line television signal, the video line counter may count from line L1 to line L262 for the first field, and from line L263 to line L525 for the second field, then returning to line L1 to line L262 for the following first field, and so forth. The video line counter 710 may include a vertical blanking interval (VBI) detector which detects the VBI (e.g., lines L1–L20, and lines L263–L283) of each video signal according to the particular characteristics of the VBI discussed previously, and a line detector which detects each horizontal line according to the horizontal sync pulse, for example. Such circuitry may be similar to that used to detect the VBI and horizontal sync pulse in conventional television sets, and is well known in the art.

A master timing generator 720 generates the network sync signal and provides it to a delay calculator 730. A programmed network sync to time slot delay value is also provided to the delay calculator 730. The delay calculator 730 receives a signal from the video line counter 710 which indicates the current line of the television signal. The reference point of the network sync signal is also detected, and the current line number which is coincident with the reference point is latched or otherwise noted.

The delay calculator 730 then determines a line number which follows the latched line number by the delay value, as discussed previously.

Note that, if the identifying data of the designated line is to be inserted into the VBI, then delay (d) should be greater than the field or frame period to ensure that a VBI is always available to carry the identifying data. Thus, the actual value of the delay (d) is driven by the frequency of the data insertion. For example, if the delay (d) is 16.8 msec., corresponding to 16.8 msec./63.55 $\mu$sec.=264.3, rounded to 265 video lines, and the network sync reference point was detected on line L211, then the next time slot would start on line 265+211=L476. The data signaling the start of the time slot on line L476 would be carried in the VBI preceding line L476, e.g., in lines L263–L283.

If the network sync reference point was detected on line L473, the next time slot would start on line $modulo_{525}$(473+265)=line L213. The data signaling the start of the time slot on line L213 would be carried in the VBI preceding line L213, e.g., in line L1–L20. This arrangement allows for an arbitrary time slot width as long as the time slot width is greater than the delay (d). That is, the time slot duration need not be a multiple of the video field rate.

Each television signal is processed in this manner to obtain a particular horizontal line number thereof which is coincident with the start time of the next designated time slot. Generally, the designated horizontal line number will vary for each television signal since the television signals 1, 2, . . . , P are asynchronous relative to one another. However, the invention is suitable for use with multiple synchronous television signals as well. Moreover, the television signals are processed for each subsequent reference point in the network sync signal. The particular designated line number may vary for a television signal due to variations in timing of the television signal, as discussed. Additionally, as discussed, it is not necessary to detect every VBI.

At a VBI data encoder 750, identifying data which identifies a particular line corresponding to the start of the next time slot is encoded. For example, digital coding may be used, where the code word "111011100" designates "line L476". Virtually any type of coding may be used for the identifying data. Identifying data is provided and encoded for each television signal. The encoded identifying data is then provided to a data insertion unit 740. The data insertion unit 740 receives the television signals 1, 2, . . . , P from the respective VBI detectors, including detector 710 (or directly from the input of VBI detector 710), and inserts the identifying data into the VBI of the corresponding television signal. The data insertion unit 740 uses well known techniques for insertion of the identifying data into the respective VBIs.

The television signals with the identifying data are then provided to a conventional modulators 760, 762 and 764 to provide modulated output signals for transmission on a cable television (CATV) network 775 or other communication network in a conventional manner.

It should be noted that the video line counter 710 may detect any predetermined reference portion of a television signal, which need not be in the VBI. However, the VBI is generally preferred since it has a nine line vertical interval with a distinctive waveform that is easily detected.

Moreover, it is not necessary to provide identifying data for each television signal. In addition, the invention is suitable for use with only one television signal. However, as discussed, the provision of identifying data with each television signal allows the decoder to transmit messages upstream without tuning to a particular channel. This is particularly advantageous when the upstream message is not related to the content of the particular channel which must be tuned, so the user can continue to view any desired channel while still gaining synchronous access to the upstream channel.

The headend 700 receives the combined upstream channel signal 765 from the communication network 775. The signal is demodulated at a demodulator 770 to recover the message data, and the data is processed at a data processor 780. The data processor 780 may perform conventional functions, such as error correction and decoding, to recover the transmitted message.

The transmitted message will be processed depending on the nature of the message. For example if the message includes commands for a computer network such as the Internet, the message will be forwarded to the appropriate network. If the message is a pay-per-view request, it will be forwarded to the appropriate authorization and billing function. If the message includes demographic data on viewing characteristics, it will be forwarded to a data gathering and analysis function.

Figure 8:
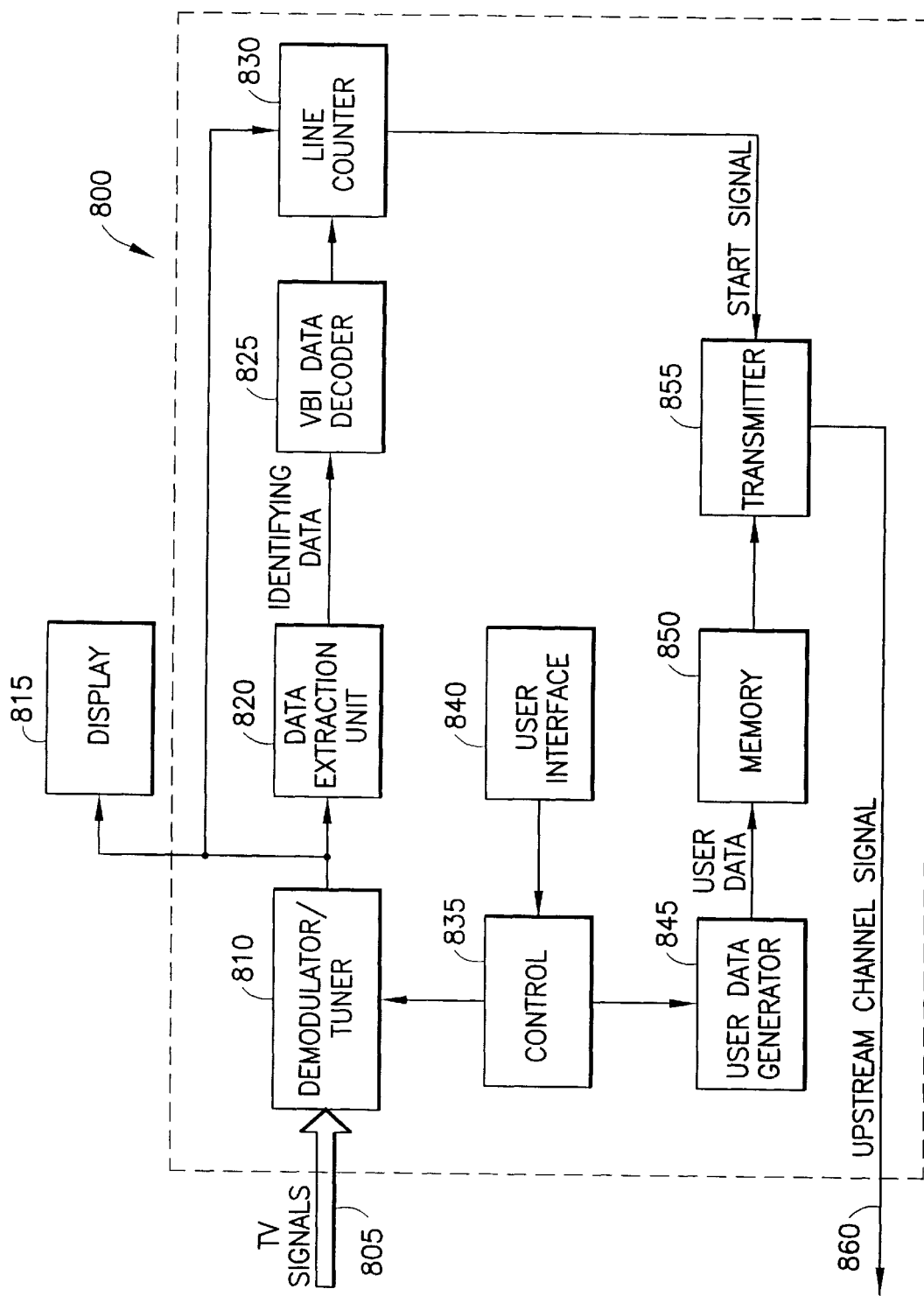
FIG. 8 illustrates a decoder in accordance with the present invention.

FIG. 8 illustrates a decoder in accordance with the present invention. The decoder, shown generally at 800, receives television signals 805 with identifying data as discussed in connection with FIG. 7 from a communication network. Typically, a particular television signal is tuned and demodulated according to a user control, such as a hand-held remote control. Some televisions provide the capability to view two or more television signals at the same time, in which case the identifying data need be extracted from only one television signal. The user control may be provided through a user interface 840 and a control 835 to select a desired channel for viewing. The selected television signal is provided to a display apparatus 815 (e.g., a television set, video monitor or personal computer), and to a data extraction unit 820. The data extraction unit performs an inverse operation of the data insertion unit 440 (FIG. 4) to obtain the identifying data from the VBI which identifies a particular horizontal scan line number of the television signal.

The identifying data is processed at a VBI data decoder 825, which performs an inverse operation of the VBI data encoder 750 (FIG. 7). The data which is output from the VBI data decoder 825 to a line counter 830 identifies a designated line of the television signal which signals the start of a time slot for communicating a message upstream. The line counter 830 also receives the tuned television signal and detects the designated line by counting the occurrence of each line. For example, the line counter 830 may detect the horizontal sync pulse of each horizontal scan line to determine when the designated line is reached. The line counter 830 may also detect the VBI of the tuned television signal in a similar manner as the video line counter 710 (FIG. 7) to gain a reference point for counting the subsequent lines.

When the line counter 830 detects that the designated line of the television signal is reached (i.e., the designated line has been received from the network), it outputs a start signal to a transmitter 855. The transmitter 855 receives user data from a memory 850, which is in turn responsive to a user data generator 845, the control 835, and the user interface 840. The transmitter 855 may begin transmitting the user data as an upstream channel signal 860 at the proper time designated by the line counter 830. Note that the transmitter may also transmit non-user data.

Other decoders will also transmit upstream channel signals, and these signals will be combined into a combined upstream channel signal using known techniques such as time division multiplexing, asynchronous transfer mode, or the like.

Transmission by the transmitter 855 may further be determined according to the channel access protocol used. For example, for a session transmission, the transmitter 855 may be required to receive a further authorizing signal in addition to the start signal from the line counter 830 to begin transmitting. Such an authorization may be provided by additional data which is transmitted in the VBI, and which identifies the particular decoder 800 or a group of decoders which are authorized to begin transmitting.

Accordingly, it can be seen that the present invention provides a system for synchronizing one or more decoders with a network sync signal at a headend of a communication network such as a cable television network. The system allows decoders to transmit upstream messages synchronously in time slots which are defined according to the network sync signal, thereby improving system throughput. Identifying data is provided in the VBI or HBI of one or more television signals to designate a horizontal scan line of the respective television signal which is coincident with the start of a time slot. The start of a time slot follows a network sync signal reference point by a network sync to time slot delay (d) which is programmed at a headend. Thus, essentially, the decoders are synchronized with a clock which is delayed from the network sync signal by the delay (d).

At each decoder, the identifying data is recovered, and the onset of the designated scan line can be used to signal the start of a transmission for the decoder.

Preferably, the identifying data is provided in each television signal so the user is not forced to tune to a particular television channel to transmit a message. The system is suitable for real-time, near real-time, or delayed transmission of user or non-user data.

Although the invention has been described in connection with various specific embodiments, those skilled in the art will appreciate that numerous adaptations and modifications may be made thereto without departing from the spirit and scope of the invention as set forth in the claims. For example, although the illustrated embodiments place identifying data in the vertical blanking interval of a television signal, it should be appreciated that the identifying data can be placed elsewhere in the television signal, e.g., in the horizontal blanking interval. In this case, the VBI detection, encoding, and decoding circuitry discussed should be replaced with corresponding HBI circuitry.

What is claimed is:

1. A method for synchronizing a decoder in a communication network to allow upstream transmission of a message from said decoder to a headend of said communication network in a time slot, wherein said decoder is adapted to receive a television signal via said communication network, comprising the steps of:

providing a network sync signal having a network sync reference point at said headend;

providing a delay value at said headend such that a start time of said time slot follows said network sync reference point by said delay value;

determining a first horizontal scan line of said television signal at said headend that corresponds to said network sync reference point;

using said delay value and said first horizontal scan line to determine a particular horizontal scan line of said television signal at said headend that corresponds to said start time;

encoding identifying data which identifies said particular horizontal scan line; and inserting said identifying data into a blanking interval of said television signal.

2. The method of claim 1, comprising the further step of:

inserting said identifying data into a blanking interval of said television signal which is between said first horizontal scan line and said particular horizontal scan line.

3. The method of claim 1, wherein:

said blanking interval of said television signal is one of a vertical blanking interval and a horizontal blanking interval.

4. The method of claim 1, comprising the further steps of:

transmitting said television signal to said decoder via said communication network;

recovering said television signal from said communication network at said decoder;

extracting said identifying data of said recovered television signal; and providing a start signal using said extracted identifying data to indicate said start time for said decoder to start transmitting said message upstream to said headend in said time slot.

5. The method of claim 4, comprising the further steps of:

monitoring horizontal scan lines of said television signal; and providing said start signal when said particular horizontal scan line of said television signal is detected.

6. The method of claim 4, wherein:

said recovering of said television signal at said decoder is responsive to a user command to view said television signal.

7. The method of claim 1, wherein said method is adapted for use in synchronizing a plurality of decoders of said communication network with said network sync signal to allow upstream transmission of a message from each of said decoders to said headend in respective time slots, wherein each of said decoders is adapted to receive a plurality of asynchronous television signals via said communication network, comprising the further steps of:

determining a respective first horizontal scan line of each of said television signals at said headend that corresponds to a respective reference point of said network sync signal;

using said delay value and said respective first horizontal scan lines to determine respective particular horizontal scan lines of said television signals at said headend that corresponds to respective start times of said respective time slots;

encoding identifying data which identifies said particular horizontal scan lines; and inserting said identifying data into respective blanking intervals of said television signals.

8. The method of claim 7, comprising the further steps of:

transmitting said television signals to said decoders via said communication network;

recovering said television signals from said communication network at said decoders;

wherein at least two of said decoders recover different ones of said television signals;

extracting said respective identifying data of said respective recovered television signals; and for each of said decoders, providing a start signal using said extracted identifying data to indicate a start time to start transmitting said respective message upstream to said headend in the respective time slot.

9. The method of claim 1, wherein:
said delay value is greater than a field or frame period of said television signal when said blanking interval of said television signal is a vertical blanking interval.

10. An apparatus for synchronizing a decoder in a communication network to allow upstream transmission of a message from said decoder to a headend of said communication network in a time slot, wherein said decoder is adapted to receive a television signal via said communication network, comprising:
means for providing a network sync signal having a network sync reference point at said headend;
means for providing a delay value at said headend such that a start time of said time slot follows said network sync reference point by said delay value;
a line counter for determining a first horizontal scan line of said television signal at said headend that corresponds to said network sync reference point;
a delay calculator for using said delay value and said first horizontal scan line to determine a particular horizontal scan line of said television signal at said headend that corresponds to said start time;
an encoder for encoding identifying data which identifies said particular horizontal scan line; and
means for inserting said identifying data into a blanking interval of said television signal.

11. The apparatus of claim 10, wherein:
said means for inserting inserts said identifying data into a blanking interval of said television signal which is between said first horizontal scan line and said particular horizontal scan line.

12. The apparatus of claim 10, wherein:
said blanking interval of said television signal is one of a vertical blanking interval and a horizontal blanking interval.

13. The apparatus of claim 10, further comprising:
a transmitter for transmitting said television signal to said decoder via said communication network;
means associated with said decoder for recovering said television signal from said communication network at said decoder;
means associated with said decoder for extracting said identifying data of said recovered television signal; and
means associated with said decoder for providing a start signal using said extracted identifying data to indicate said start time for said decoder to start transmitting said message upstream to said headend in said time slot.

14. The apparatus of claim 13, further comprising:
a line counter associated with said decoder for monitoring horizontal scan lines of said television signal; wherein:
said means associated with said decoder for providing said start signal provides said start signal when said particular horizontal scan line of said television signal is detected.

15. The apparatus of claim 13, wherein:
said recovering of said television signal at said decoder is responsive to a user command to view said television signal.

16. The apparatus of claim 10, wherein:
said apparatus is adapted for use in synchronizing a plurality of decoders of said communication network with said network sync signal to allow upstream transmission of a message from each of said decoders to said headend in respective time slots;
each of said decoders is adapted to receive a plurality of asynchronous television signals via said communication network;
said line counter at said headend determines a respective first horizontal scan line of each of said television signals at said headend that corresponds to a respective reference point of said network sync signal;
delay calculation means are provided for using said delay value and said respective first horizontal scan lines to determine respective particular horizontal scan lines of said television signals at said headend that correspond to respective start times of said respective time slots;
said encoder encodes identifying data which identifies said particular horizontal scan lines; and
said means for inserting inserts said identifying data into respective blanking intervals of said television signals.

17. The apparatus of claim 16, wherein said transmitter transmits said television signals to said decoders via said communication network, and each of said decoders further comprises:
means for recovering said television signals from said communication network;
wherein at least two of said decoders recover different ones of said television signals;
means for extracting said respective identifying data of said respective recovered television signals; and
means for providing a start signal using said extracted identifying data to indicate a start time to start transmitting said respective message upstream to said headend in the respective time slot.

18. The apparatus of claim 10, wherein:
said delay value is greater than a field or frame period of said television signal when said blanking interval of said television signal is a vertical blanking interval.

19. A method for synchronizing a decoder in a communication network with a network sync signal at a headend of said network to allow upstream transmission of a message from said decoder to said headend in a time slot, comprising the steps of:
recovering a television signal from said communication network;
said television signal comprising identifying data in a blanking interval which identifies a particular horizontal scan line of said television signal which corresponds to a start time of said time slot;
extracting said identifying data of said recovered television signal; and
providing a start signal using said extracted identifying data to indicate said start time for said decoder to start transmitting said message upstream to said headend.

20. The method of claim 19, wherein:
said start time follows a network sync reference point of said network sync signal by a delay value.

21. The method of claim 19, wherein:
said blanking interval of said television signal is one of a vertical blanking interval and a horizontal blanking interval.

22. The method of claim 19, comprising the further steps of:
monitoring horizontal scan lines of said television signal; and
providing said start signal when said particular horizontal scan line of said television signal is detected.

23. The method of claim 19, wherein:

said recovering of said television signal is responsive to a user command to view said television signal.

24. The method of claim 19, wherein:

said recovered television signal is recovered from among a plurality of available asynchronous television signals which are transmitted to said decoder via said communication network; and each of said plurality of available television signals comprises identifying data in a blanking interval thereof which identifies a particular horizontal scan line thereof which corresponds to said start time of said time slot.

25. The method of claim 20, wherein:

said delay value is greater than a field or frame period of said television signal when said blanking interval of said television signal is a vertical blanking interval.

26. A decoder which is adapted to be synchronized with a network sync signal at a headend of a communication network to allow upstream transmission of a message from said decoder to said headend in a time slot, comprising:

means for recovering a television signal from said communication network;

said television signal comprising identifying data in a blanking interval which identifies a particular horizontal scan line of said television signal which corresponds to a start time of said time slot;

means for extracting said identifying data of said recovered television signal; and means for providing a start signal using said extracted identifying data to indicate said start time for said decoder to start transmitting said message upstream to said headend.

27. The decoder of claim 26, wherein:

said start time follows a network sync reference point of said network sync signal by a delay value.

28. The decoder of claim 26, wherein:

said blanking interval of said television signal is one of a vertical blanking interval and a horizontal blanking interval.

29. The decoder of claim 26, further comprising:

means for monitoring horizontal scan lines of said television signal; wherein:

said providing means provides said start signal when said particular horizontal scan line of said television signal is detected.

30. The decoder of claim 26, wherein:

said recovering of said television signal is responsive to a user command to view said television signal.

31. The decoder of claim 26, wherein:

said recovered television signal is recovered from among a plurality of available asynchronous television signals which are transmitted to said decoder via said communication network; and each of said plurality of available television signals comprising identifying data in a blanking interval thereof which identifies a particular horizontal scan line thereof which corresponds to said start time of said time slot.

32. The decoder of claim 27, wherein:

said delay value is greater than a field or frame period of said television signal when said blanking interval of said television signal is a vertical blanking interval.

* * * * *